United States Patent
Fitzpatrick et al.

(10) Patent No.: US 9,361,222 B2
(45) Date of Patent: Jun. 7, 2016

(54) ELECTRONIC SYSTEM WITH STORAGE DRIVE LIFE ESTIMATION MECHANISM AND METHOD OF OPERATION THEREOF

(71) Applicant: Smart Storage Systems, Inc., Milpitas, CA (US)

(72) Inventors: James Fitzpatrick, Sudbury, MA (US); Mark Dancho, Chandler, AZ (US); James M. Higgins, Chandler, AZ (US); James M. Kresse, Gilbert, AZ (US)

(73) Assignee: SMART STORAGE SYSTEMS, INC., Milpitas, CA (US)

( * ) Notice: Subject to any disclaimer, the term of this patent is extended or adjusted under 35 U.S.C. 154(b) by 1 day.

(21) Appl. No.: 14/334,324

(22) Filed: Jul. 17, 2014

(65) Prior Publication Data
US 2015/0046635 A1    Feb. 12, 2015

Related U.S. Application Data

(60) Provisional application No. 61/863,411, filed on Aug. 7, 2013.

(51) Int. Cl.
G06F 12/00    (2006.01)
G06F 12/02    (2006.01)
G06F 11/00    (2006.01)

(52) U.S. Cl.
CPC .......... G06F 12/0246 (2013.01); G06F 11/008 (2013.01); *G06F 2212/7211* (2013.01)

(58) Field of Classification Search
USPC ........................................................ 711/103
See application file for complete search history.

(56) References Cited

U.S. PATENT DOCUMENTS

| | | | |
|---|---|---|---|
| 4,048,481 | A | 9/1977 | Bailey, Jr. et al. |
| 4,839,587 | A | 6/1989 | Flatley et al. |
| 5,034,744 | A | 7/1991 | Obinata |
| 5,210,854 | A | 5/1993 | Beaverton et al. |
| 5,311,395 | A | 5/1994 | McGaha et al. |
| 5,450,354 | A | 9/1995 | Sawada et al. |
| 5,479,638 | A | 12/1995 | Assar et al. |
| 5,784,174 | A | 7/1998 | Fujino et al. |
| 5,790,828 | A | 8/1998 | Jost |
| 5,930,504 | A | 7/1999 | Gabel |
| 5,949,785 | A | 9/1999 | Beasley |
| 5,963,983 | A | 10/1999 | Sakakura et al. |

(Continued)

FOREIGN PATENT DOCUMENTS

| | | |
|---|---|---|
| EP | 1 956 489 A2 | 8/2008 |
| EP | 1 990 921 A2 | 11/2008 |

(Continued)

OTHER PUBLICATIONS

Narayanan et al., "Migrating Server Storage to SSDs: Analysis of Tradeoffs," Computer , Systems, Apr. 2009, 12 pages.

(Continued)

*Primary Examiner* — Jared Rutz
*Assistant Examiner* — Hamdy S Ahmed
(74) *Attorney, Agent, or Firm* — Morgan, Lewis & Bockius LLP

(57) ABSTRACT

Systems, methods and/or devices are used to enable storage drive life estimation. In one aspect, the method includes (1) determining two or more age criteria of a storage drive, and (2) determining a drive age of the storage drive in accordance with the two or more age criteria of the storage drive.

20 Claims, 6 Drawing Sheets

(56) References Cited

U.S. PATENT DOCUMENTS

| | | |
|---|---|---|
| 6,034,897 A | 3/2000 | Estakhri et al. |
| 6,069,827 A | 5/2000 | Sinclair |
| 6,091,652 A | 7/2000 | Haehn et al. |
| 6,275,436 B1 | 8/2001 | Tobita et al. |
| 6,345,367 B1 | 2/2002 | Sinclair |
| 6,356,447 B2 | 3/2002 | Scafidi |
| 6,381,176 B1 | 4/2002 | Kim et al. |
| 6,381,670 B1 | 4/2002 | Lee et al. |
| 6,412,080 B1 | 6/2002 | Fleming et al. |
| 6,529,997 B1 | 3/2003 | Debiez et al. |
| 6,552,581 B1 | 4/2003 | Gabara |
| 6,587,915 B1 | 7/2003 | Kim |
| 6,618,249 B2 | 9/2003 | Fairchild |
| 6,661,503 B1 | 12/2003 | Yamaguchi et al. |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,871,304 B2 | 3/2005 | Hadjihassan et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,298,888 B2 | 11/2007 | Hamar |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,558,109 B2 | 7/2009 | Brandman et al. |
| 7,613,871 B2 | 11/2009 | Tanaka et al. |
| 7,620,710 B2 | 11/2009 | Kottomtharayil et al. |
| 7,620,769 B1 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,693,422 B2 | 4/2010 | Alicherry et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,853,749 B2 | 12/2010 | Kolokowsky |
| 7,979,614 B1 | 7/2011 | Yang |
| 8,000,161 B2 | 8/2011 | Stan et al. |
| 8,001,135 B2 | 8/2011 | Perlmutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,205,028 B1 | 6/2012 | Sakarda |
| 8,209,677 B2 | 6/2012 | Shintani et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,250,621 B2 | 8/2012 | Cha |
| 8,254,172 B1 | 8/2012 | Kan |
| 8,259,506 B1 | 9/2012 | Sommer et al. |
| 8,289,801 B2 | 10/2012 | Smith et al. |
| 8,296,534 B1 | 10/2012 | Gupta et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,386,860 B2 | 2/2013 | Tseng et al. |
| 8,397,101 B2 | 3/2013 | Goss et al. |
| 8,407,409 B2 | 3/2013 | Kawaguchi |
| 8,464,106 B2 | 6/2013 | Filor et al. |
| 8,503,238 B1 | 8/2013 | Wu et al. |
| 8,521,981 B2 | 8/2013 | Strauss et al. |
| 8,560,770 B2 | 10/2013 | Haines et al. |
| 8,601,203 B2 | 12/2013 | Holbrook et al. |
| 8,612,669 B1 | 12/2013 | Syu et al. |
| 8,612,804 B1 | 12/2013 | Kang et al. |
| 8,661,184 B2 | 2/2014 | Wood et al. |
| 8,694,811 B2 | 4/2014 | Raju et al. |
| 8,725,931 B1 | 5/2014 | Kang |
| 8,750,052 B2 | 6/2014 | Aoki et al. |
| 8,793,556 B1 | 7/2014 | Northcott et al. |
| 8,799,747 B2 | 8/2014 | Goss et al. |
| 8,832,506 B2 | 9/2014 | Griffin et al. |
| 8,862,818 B1 | 10/2014 | Ozdemir |
| 8,880,838 B2 | 11/2014 | Kaiser et al. |
| 8,984,216 B2 | 3/2015 | Fillingim |
| 9,043,668 B2 | 5/2015 | Goss et al. |
| 9,063,844 B2 | 6/2015 | Higgins et al. |
| 9,069,468 B2 | 6/2015 | Mehra et al. |
| 9,116,401 B2 | 8/2015 | Kim et al. |
| 2002/0056025 A1 | 5/2002 | Qiu et al. |
| 2002/0156891 A1 | 10/2002 | Ulrich et al. |
| 2002/0159285 A1 | 10/2002 | Morley et al. |
| 2003/0033308 A1 | 2/2003 | Patel et al. |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0088511 A1 | 5/2004 | Bacon et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2005/0076102 A1 | 4/2005 | Chen et al. |
| 2005/0144516 A1 | 6/2005 | Gonzalez et al. |
| 2006/0015683 A1 | 1/2006 | Ashmore et al. |
| 2006/0020745 A1 | 1/2006 | Conley et al. |
| 2006/0022054 A1 | 2/2006 | Elhamias et al. |
| 2006/0080505 A1 | 4/2006 | Arai et al. |
| 2006/0136682 A1 | 6/2006 | Haridas et al. |
| 2006/0143365 A1 | 6/2006 | Kikuchi |
| 2006/0143475 A1 | 6/2006 | Herbert et al. |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0050536 A1 | 3/2007 | Kolokowsky |
| 2007/0061511 A1 | 3/2007 | Faber |
| 2007/0067598 A1 | 3/2007 | Fujimoto |
| 2007/0079152 A1 | 4/2007 | Winick et al. |
| 2007/0083779 A1 | 4/2007 | Misaka et al. |
| 2007/0226592 A1 | 9/2007 | Radke |
| 2007/0234004 A1 | 10/2007 | Oshima et al. |
| 2007/0260811 A1 | 11/2007 | Merry, Jr. et al. |
| 2007/0263444 A1 | 11/2007 | Gorobets et al. |
| 2007/0276973 A1 | 11/2007 | Tan et al. |
| 2008/0028246 A1 | 1/2008 | Witham |
| 2008/0046630 A1 | 2/2008 | Lasser |
| 2008/0052446 A1 | 2/2008 | Lasser et al. |
| 2008/0082736 A1 | 4/2008 | Chow et al. |
| 2008/0126720 A1 | 5/2008 | Danilak |
| 2008/0183918 A1 | 7/2008 | Dhokia et al. |
| 2008/0189588 A1 | 8/2008 | Tanaka et al. |
| 2008/0263289 A1 | 10/2008 | Hosoya et al. |
| 2008/0313505 A1 | 12/2008 | Lee et al. |
| 2009/0006900 A1 | 1/2009 | Lastras-Montano et al. |
| 2009/0019321 A1 | 1/2009 | Radke |
| 2009/0070651 A1 | 3/2009 | Diggs et al. |
| 2009/0083587 A1 | 3/2009 | Ng et al. |

(56) References Cited

U.S. PATENT DOCUMENTS

| | | |
|---|---|---|
| 2009/0089485 A1 | 4/2009 | Yeh |
| 2009/0091990 A1 | 4/2009 | Park et al. |
| 2009/0109786 A1 | 4/2009 | Ye et al. |
| 2009/0125670 A1 | 5/2009 | Keays |
| 2009/0132756 A1 | 5/2009 | Hsieh |
| 2009/0138654 A1 | 5/2009 | Sutardja |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0164710 A1 | 6/2009 | Choi et al. |
| 2009/0172248 A1 | 7/2009 | You |
| 2009/0172262 A1 | 7/2009 | Olbrich et al. |
| 2009/0179707 A1 | 7/2009 | Higashino |
| 2009/0183183 A1 | 7/2009 | Muppirala et al. |
| 2009/0228634 A1 | 9/2009 | Nakamura et al. |
| 2009/0228761 A1 | 9/2009 | Perlmutter et al. |
| 2009/0259819 A1 | 10/2009 | Chen et al. |
| 2009/0259896 A1 | 10/2009 | Hsu et al. |
| 2009/0271562 A1 | 10/2009 | Sinclair |
| 2009/0287975 A1 | 11/2009 | Kim et al. |
| 2009/0300238 A1 | 12/2009 | Panabaker et al. |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0017650 A1 | 1/2010 | Chin et al. |
| 2010/0023674 A1 | 1/2010 | Aviles |
| 2010/0050053 A1 | 2/2010 | Wilson et al. |
| 2010/0082890 A1 * | 4/2010 | Heo et al. ................ 711/103 |
| 2010/0122019 A1 | 5/2010 | Flynn et al. |
| 2010/0128537 A1 | 5/2010 | Suhail et al. |
| 2010/0138592 A1 | 6/2010 | Cheon |
| 2010/0165689 A1 | 7/2010 | Rotbard et al. |
| 2010/0169541 A1 | 7/2010 | Freikorn |
| 2010/0172179 A1 | 7/2010 | Gorobets et al. |
| 2010/0174845 A1 | 7/2010 | Gorobets et al. |
| 2010/0217898 A1 | 8/2010 | Priborsky et al. |
| 2010/0217915 A1 | 8/2010 | O'Connor et al. |
| 2010/0223531 A1 | 9/2010 | Fukutomi et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0325340 A1 | 12/2010 | Feldman et al. |
| 2010/0332726 A1 | 12/2010 | Wang |
| 2011/0002224 A1 | 1/2011 | Tamura |
| 2011/0016239 A1 | 1/2011 | Stenfort |
| 2011/0055455 A1 | 3/2011 | Post et al. |
| 2011/0055468 A1 | 3/2011 | Gonzalez et al. |
| 2011/0066788 A1 | 3/2011 | Eleftheriou et al. |
| 2011/0072423 A1 | 3/2011 | Fukata |
| 2011/0078393 A1 | 3/2011 | Lin |
| 2011/0099342 A1 | 4/2011 | Ozdemir |
| 2011/0107144 A1 | 5/2011 | Ohara |
| 2011/0131365 A1 | 6/2011 | Zhang et al. |
| 2011/0131447 A1 | 6/2011 | Prakash et al. |
| 2011/0132000 A1 | 6/2011 | Deane et al. |
| 2011/0138100 A1 | 6/2011 | Sinclair |
| 2011/0145473 A1 | 6/2011 | Maheshwari |
| 2011/0161775 A1 | 6/2011 | Weingarten |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0209032 A1 | 8/2011 | Choi et al. |
| 2011/0238892 A1 | 9/2011 | Tsai et al. |
| 2011/0239088 A1 | 9/2011 | Post |
| 2011/0258496 A1 | 10/2011 | Tseng et al. |
| 2011/0314219 A1 | 12/2011 | Ulrich et al. |
| 2011/0320687 A1 | 12/2011 | Belluomini et al. |
| 2012/0008401 A1 | 1/2012 | Katz et al. |
| 2012/0011336 A1 | 1/2012 | Saika |
| 2012/0023144 A1 | 1/2012 | Rub |
| 2012/0047318 A1 | 2/2012 | Yoon et al. |
| 2012/0047320 A1 | 2/2012 | Yoo et al. |
| 2012/0047409 A1 | 2/2012 | Post et al. |
| 2012/0066450 A1 | 3/2012 | Yochai et al. |
| 2012/0079348 A1 | 3/2012 | Naeimi |
| 2012/0079355 A1 | 3/2012 | Patapoutian et al. |
| 2012/0096217 A1 | 4/2012 | Son et al. |
| 2012/0124046 A1 | 5/2012 | Provenzano |
| 2012/0124273 A1 | 5/2012 | Goss et al. |
| 2012/0151260 A1 | 6/2012 | Zimmermann et al. |
| 2012/0170365 A1 | 7/2012 | Kang et al. |
| 2012/0185706 A1 | 7/2012 | Sistla et al. |
| 2012/0213004 A1 | 8/2012 | Yun et al. |
| 2012/0216085 A1 | 8/2012 | Weingarten et al. |
| 2012/0236656 A1 | 9/2012 | Cometti |
| 2012/0239858 A1 | 9/2012 | Melik-Martirosian |
| 2012/0254686 A1 | 10/2012 | Esumi et al. |
| 2012/0266011 A1 | 10/2012 | Storer et al. |
| 2012/0266048 A1 | 10/2012 | Chung et al. |
| 2012/0278530 A1 | 11/2012 | Ebsen |
| 2012/0278531 A1 | 11/2012 | Horn |
| 2012/0284587 A1 | 11/2012 | Yu et al. |
| 2012/0297113 A1 | 11/2012 | Belluomini et al. |
| 2012/0311402 A1 | 12/2012 | Tseng et al. |
| 2012/0317334 A1 | 12/2012 | Suzuki et al. |
| 2012/0324191 A1 | 12/2012 | Strange et al. |
| 2012/0331207 A1 | 12/2012 | Lassa et al. |
| 2013/0007380 A1 | 1/2013 | Seekins et al. |
| 2013/0007543 A1 | 1/2013 | Goss et al. |
| 2013/0054881 A1 | 2/2013 | Ellis et al. |
| 2013/0060994 A1 | 3/2013 | Higgins et al. |
| 2013/0061019 A1 | 3/2013 | Fitzpatrick et al. |
| 2013/0073788 A1 | 3/2013 | Post et al. |
| 2013/0073797 A1 | 3/2013 | Chowdhury |
| 2013/0074093 A1 | 3/2013 | Gounares et al. |
| 2013/0080691 A1 | 3/2013 | Weingarten et al. |
| 2013/0094289 A1 | 4/2013 | Sridharan et al. |
| 2013/0100600 A1 | 4/2013 | Yin et al. |
| 2013/0104005 A1 | 4/2013 | Weingarten et al. |
| 2013/0124792 A1 | 5/2013 | Melik-Martirosian et al. |
| 2013/0151753 A1 | 6/2013 | Jeon et al. |
| 2013/0198436 A1 | 8/2013 | Bandic et al. |
| 2013/0205102 A1 | 8/2013 | Jones et al. |
| 2013/0232290 A1 | 9/2013 | Ish et al. |
| 2013/0238833 A1 | 9/2013 | Vogan et al. |
| 2013/0265825 A1 | 10/2013 | Lassa |
| 2013/0304998 A1 | 11/2013 | Palmer |
| 2013/0326116 A1 | 12/2013 | Goss et al. |
| 2013/0332791 A1 | 12/2013 | Chu |
| 2014/0036589 A1 | 2/2014 | Parthasarathy et al. |
| 2014/0059359 A1 | 2/2014 | Bahirat |
| 2014/0108891 A1 | 4/2014 | Strasser et al. |
| 2014/0129874 A1 | 5/2014 | Zaltsman et al. |
| 2014/0158525 A1 | 6/2014 | Greene |
| 2014/0181370 A1 | 6/2014 | Cohen et al. |
| 2014/0208174 A1 | 7/2014 | Ellis et al. |
| 2014/0258769 A1 | 9/2014 | Baryudin et al. |
| 2014/0372777 A1 | 12/2014 | Reller et al. |

FOREIGN PATENT DOCUMENTS

| | | |
|---|---|---|
| EP | 2 498 259 A2 | 9/2012 |
| JP | 2012129859 A | 7/2012 |
| WO | WO 2009/042298 A1 | 4/2009 |
| WO | WO 2011/156466 A2 | 12/2011 |

OTHER PUBLICATIONS

Shiraz et al., "Block Aging Prevention Technique (BAP) for Flash Based Solid State Disks," 7th International Conference on Emerging Technologies (ICET), Sep. 5, 2011, 6 pages.
Tai et al., "Prolongation of Lifetime and the Evaluation Method of Dependable SSD," 25 International Symposium on Defect and Fault Tolerance in VLSI Systems, 2010, NJ, USA, 8 pages.
Tseng et al., "Understanding the Impact of Power Loss on Flash Memory," DAC'11, Jun. 5-10, 2011, San Diego, California, 6 pages.
Yimo et al., "WeLe-RAID: A SSD-Based RAID for System Endurance and Performance," Jan. 2011, Network and Parallel Computing, Springer, 14 pages.

(56) References Cited

OTHER PUBLICATIONS

International Search Report and Written Opinion dated Feb. 18, 2015, received in International Patent Application No. PCT/US2014/065401, which corresponds to U.S. Appl. No. 14/082,031, 9 pages (Higgins).
International Search Report dated Apr. 15, 2014, received in International Patent Application No. PCT/US2013/078340, which corresponds to U.S. Appl. No. 13/746,642, 11 pages (Ellis).
International Search Report and Written Opinion dated Jan. 9, 2015, received in International Patent Application No. PCT/US2014/049731, which corresponds to U.S. Appl. No. 14/334,324, 9 pages (Fitzpatrick).
Cooke, "Introduction to Flash Memory (T1 A)," Flash Memory Summit, Aug. 22, 2008, Micron Technology, Inc., 102 pages.
Gal et al., "Algotithms and Data Structures for Flash Memories," ACM Computing Surveys, Jun. 2005, vol. 37, No. 2, 30 pages.
IBM Corporation, "Systems Management, Work Management," Version 5, Release 4, 9th Edition, Feb. 2006, pp. 1-21.
O'Brien, "SMART Storage Systems Optimus SAS Enterprise SSD Review," SMART Storage Systems, Oct. 9, 2012, 44 pages.
Spanjer, "Flash Management—Why and How?" Smart Modular Technologies, Nov. 2009, http://www.scantec.de/fileadmin/pdf/Smart_Modular/Flash-Management.pdf, 14 pages.
Texas Instruments, "Power Management IC for Digital Set Top Boxes," SLVSA10A, Sep. 2009, pp. 1-22.
International Search Report and Written Opinion dated Dec. 20, 2013, received in PCT/US2013/045282, which corresponds to U.S. Appl. No. 13/493,949, 7 pages (Ellis).
International Search Report and Written Opinion dated Jun. 12, 2014, received in PCT/US2014/018972, which corresponds to U.S. Appl. No. 13/779,352, 12 pages (Schmier).
International Search Report and Written Opinion dated May 14, 2014, received in International Patent Application No. PCT/US2014/017168, which corresponds to U.S. Appl. No. 14/076,115, 6 pages (Fitzpatrick).
International Search Report and Written Opinion dated May 14, 2014, received in International Patent Application No. PCT/US2014/017169, which corresponds to U.S. Appl. No. 14/076,148, 6 pages (Fitzpatrick).
Ulinktech, "ATA Command Table (in Alphabetic Order)," Feb. 6, 2011, https://web.archive.org/web/20110206060820/http://www.ulinktech.com/downloads/AT, 6 pages.
International Search Report and Written Opinion dated Aug. 22, 2014, received in International Patent Application No. PCT/US2014/032978, which corresponds to U.S. Appl. No. 14/081,992, 10 pages (Ellis).
International Search Report dated Mar. 25, 2014, received in International Patent Application No. PCT/US2013/072400, which corresponds to U.S. Appl. No. 13/690,337, 3 pages (Ellis).
Invitation to Pay Additional Fees dated Jul. 25, 2014, received in International Patent Application No. PCT/US2014/021290, which corresponds to U.S. Appl. No. 13/791,797, 8 paaes (Dean).
International Search Report and Written Opinion dated Jul. 31, 2014, received in International Patent Application No. PCT/US2014/031465, which corresponds to U.S. Appl. No. 13/851,928, 13 pages (Ellis).
International Search Report and Written Opinion dated Jul. 31, 2014, received in International Patent Application No. PCT/US2014/033876, which corresponds to U.S. Appl. No. 13/861,326, 9 pages (Fitzpatrick).
International Search Report and Written Opinion dated Nov. 7, 2014, received in International Patent Application No. PCT/US2014/049732, which corresponds to U.S. Appl. No. 14/334,350, 13 pages (Fitzpatrick).
International Search Report and Written Opinion dated Oct. 7, 2014, received in International Patent Application No. PCT/US2014/049734, which corresponds to U.S. Appl. No. 14/332,259, 8 pages (Higgins).
International Search Report and Written Opinion dated Oct. 23, 2014, received in International Patent Application No. PCT/US2014/049736, which corresponds to U.S. Appl. No. 14/446,249, 8 pages (Fitzpatrick).
International Search Report and Written Opinion dated Nov. 5, 2014, received in International Patent Application No. PCT/US2014/049282, which corresponds to U.S. Appl. No. 13/957,407,12 pages (Fitzpatrick).
Online Merriam Webster Dictionary, definition of "Distinct" from Jun. 12, 2011, https://web.archive.org/web/20110612181129/http://www2.merriam-webster.com/cgi-bin/mwdictadu?book=Dictionary&va=distinct.

\* cited by examiner

ELECTRONIC SYSTEM WITH STORAGE DRIVE LIFE ESTIMATION MECHANISM AND METHOD OF OPERATION THEREOF

RELATED APPLICATION

This application claims priority to U.S. Provisional Patent Application Ser. No. 61/863,411, filed Aug. 7, 2013, entitled "Electronic System with Storage Drive Life Estimation Mechanism and Method of Operation Thereof," which is hereby incorporated by reference in its entirety.

TECHNICAL FIELD

The present invention relates generally to an electronic system and more particularly to a system with storage drive life estimation mechanism.

BACKGROUND

All electronic systems require some form of memory or storage. Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

Recently, forms of long-term storage other than electromechanical hard disks have become feasible for use in computers. One of these is flash Electrically Erasable Programmable Read-Only Memory (EEPROM). Flash EEPROM memory includes a plurality of floating-gate field effect transistors arranged as memory cells. NAND flash is one form of non-volatile memory used in solid state storage devices. The memory cells are arranged in typical row and column fashion with circuitry for accessing individual cells. The memory transistors of those cells can store an analog value that can be interpreted to hold two logical states for Single Level Cell (SLC) or more than two logical states as for Multi Level Cells (MLC).

A flash memory cell, like a typical EEPROM cell but in contrast to Dynamic random-access memory (DRAM) memory, retains information when power is removed. Flash EEPROM memory has a number of characteristics, which adapt it to use as long-term memory. It is light in weight, occupies very little space, and consumes less power than electromechanical disk drives. Construction of a storage system with this type of memory allows for much higher bandwidth and higher input output operations per second than a typical electromechanical disk drive. More importantly, it is especially rugged and can operate at a much higher temperature range. It will withstand, without adverse effects, repeated drops, each of which would destroy a typical electromechanical hard disk drive. A problem exhibited by flash memory and storage devices that consist of flash memory is that it tends to have a limited life in use.

Thus, a need still remains for better storage life estimation to account for the failure and durability of electronic systems. In view of the increasing demand for storage management of electronic systems, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DETAILED DESCRIPTION

Figure 1:
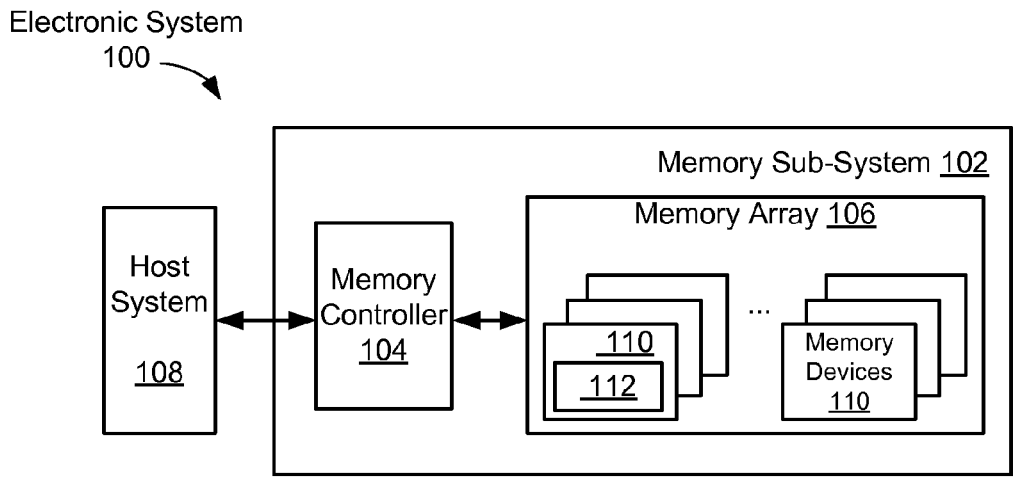
FIG. 1 is an electronic system with storage drive life estimation mechanism in an embodiment of the present invention.

The various implementations described herein include systems, methods and/or devices used to enable storage drive life estimation. Some implementations include systems, methods and/or devices to determine, in accordance with two or more age criteria of a storage device, a drive age of the storage device.

More specifically, some embodiments include a method of operation of an electronic system. In some embodiments, the method includes (1) determining two or more age criteria of a storage drive, and (2) determining a drive age of the storage drive in accordance with the two or more age criteria of the storage drive.

In some embodiments, the two or more age criteria include at least one criterion selected from the group consisting of a total number of accumulated program/erase (PE) cycles, a total number of grown defects, a defect rate, and a retry rate.

In some embodiments, the two or more age criteria are scaled by respective configurable factors to adjust relative importance of each respective age criterion on the drive age of the storage drive.

In some embodiments, determining a drive age of the storage drive in accordance with the two or more age criteria of the storage drive includes (1) determining a first scaled age criterion by multiplying a first configurable factor by a first age criterion of the two or more age criteria, (2) determining a first drive age indicator by multiplying the drive age by a first maximum age criterion for the storage drive, wherein the first maximum age criterion is a maximum value of the first age criterion, (3) determining whether the first scaled age criterion is greater than or equal to the first drive age indicator, (4) in accordance with a determination that the first scaled age criterion is greater than or equal to the first drive age indicator, incrementing the drive age, and (5) in accordance with a determination that the first scaled age criterion is not greater than or equal to the first drive age indicator, performing one or more operations including (a) determining a second scaled age criterion by multiplying a second configurable factor by a second age criterion of the two or more age criteria, (b) determining a second drive age indicator by multiplying the drive age by a second maximum age criterion for the storage drive, wherein the second maximum age criterion is a maximum value of the second age criterion, (c) determining whether the second scaled age criterion is greater than or equal to the second drive age indicator, and (d) in accordance with a determination that the second scaled age criterion is greater than or equal to the second drive age indicator, incrementing the drive age.

In some embodiments, the drive age is monotonically non-decreasing.

In some embodiments, the drive age is an integer.

In some embodiments, the storage drive comprises one or more flash memory devices.

In another aspect, any of the methods described above are performed by an electronic system, the electronic system including (1) one or more processors, and (2) memory storing one or more programs to be executed by the one or more processors, the one or more programs comprising instructions for performing or controlling performance of any of the methods described herein.

In yet another aspect, some embodiments include a non-transitory computer readable storage medium, storing one or more programs configured for execution by one or more processors of an electronic system, the one or more programs including instructions for performing or controlling performance of any of the methods described herein.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include hardware, software running on or coupled to hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including but not limited to temperature sensors, or a combination thereof.

Solid State drives (SSDs) have a finite useful life presenting challenges to long term use and data storage. To plan for eventual replacement, a system and method for determining an estimate of drive life is needed. Estimations of storage drive life are also needed for warranty and resale purposes.

It is therefore desirable to have a system and method of estimating the percentage of a storage drive's expected life that has already been used. Furthermore, it is desirable that this estimate correlate well to the actual percentage of the drive's useful life while being relatively easy to compute. Finally, it is desirable that the measure reflect how a drive wears out, so that it is monotonically non-decreasing, and so that no possible values are skipped. In this way, the measure would never appear to run backwards or have large discontinuities, which would be confusing or misleading.

Referring now to FIG. 1, therein is shown an electronic system 100 with storage management mechanism in an embodiment of the present invention. The electronic system 100 includes a memory sub-system 102 having a memory controller 104 and a memory array 106. The electronic system 100 includes a host system 108 communicating with the memory sub-system 102.

The memory controller 104 provides data control and management of the memory array 106. The memory controller 104 interfaces with the host system 108 and controls the memory array 106 to transfer data between the host system 108 and the memory array 106.

The memory array 106 includes an array of memory devices 110 including flash memory devices or non-volatile memory devices. The memory array 106 can include pages of data or information. The host system 108 can request the memory controller 104 for reading, writing, and deleting data from or to the logical address space of the storage device that includes the memory array 106.

The memory devices 110 can include chip selects 112, which are defined as control inputs, for enabling the memory devices 110. Each of the chip selects 112 can be used to control the operation of one of the memory devices 110. When the chip selects 112 are enabled, the memory devices 110 are in active state for operation including reading, writing, or recycling. This is also true for sub addresses LUNs (logical units) within a device controlled by one chip select.

Figure 2:
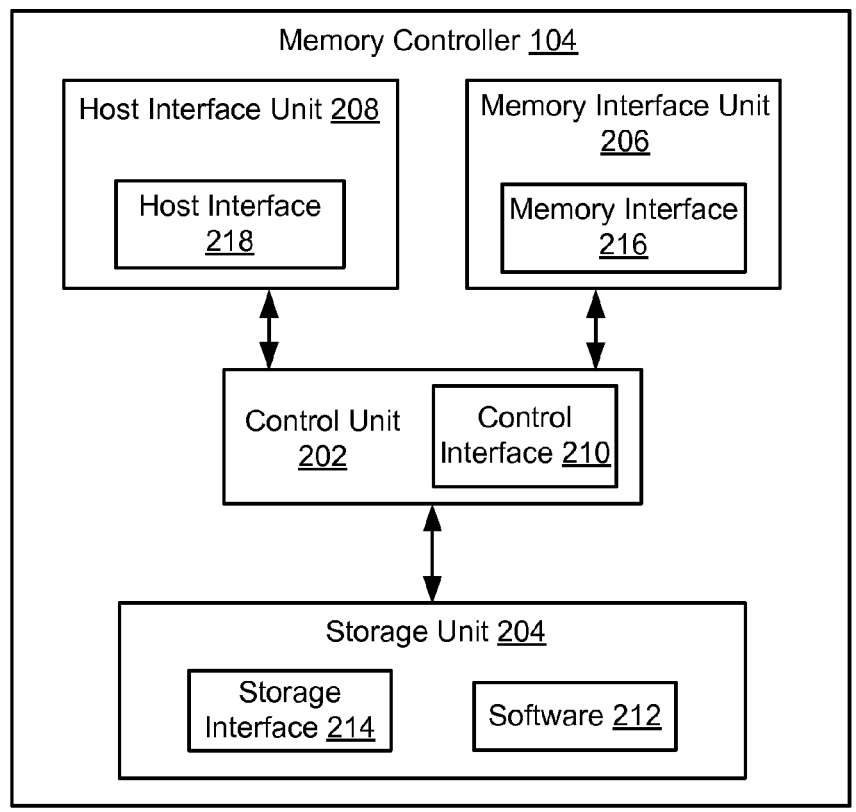
FIG. 2 is an exemplary hardware block diagram of the memory controller.

Referring now to FIG. 2, therein is shown an exemplary hardware block diagram of the memory controller 104. The memory controller 104 can include a control unit 202, a storage unit 204, a memory interface unit 206, and a host interface unit 208. The control unit 202 can include a control interface 210. The control unit 202 can execute software 212 stored in the storage unit 204 to provide the intelligence of the memory controller 104.

The control unit 202 can be implemented in a number of different manners. For example, the control unit 202 can be a processor, an embedded processor, a microprocessor, a hardware control logic, a hardware finite state machine (FSM), a digital signal processor (DSP), or a combination thereof.

The control interface 210 can be used for communication between the control unit 202 and other functional units in the memory controller 104. The control interface 210 can also be used for communication that is external to the memory controller 104.

The control interface 210 can receive information from the other functional units or from external sources, or can transmit information to the other functional units or to external destinations. The external sources and the external destinations refer to sources and destinations external to the memory controller 104.

The control interface 210 can be implemented in different ways and can include different implementations depending on which functional units or external units are being interfaced with the control interface 210. For example, the control interface 210 can be implemented with dedicated hardware such as an application-specific integrated circuit (ASIC), configurable hardware such as an FPGA (Field Programmable Gate Array), discrete electronic hardware, or a combination thereof.

The storage unit 204 can include hardware, control firmware, and the software 212. The storage unit 204 can contain a volatile memory, a non-volatile memory, an internal memory, an external memory, or a combination thereof. For example, the storage unit 204 can be a non-volatile storage such as non-volatile random access memory (NVRAM), Flash memory, disk storage, or a volatile storage such as static random access memory (SRAM).

The storage unit 204 can include a storage interface 214. The storage interface 214 can also be used for communication that is external to the memory controller 104. The storage interface 214 can receive information from the other functional units or from external sources, or can transmit information to the other functional units or to external destinations. The external sources and the external destinations refer to sources and destinations external to the memory controller 104.

The storage interface 214 can include different implementations depending on which functional units or external units are being interfaced with the storage unit 204. The storage interface 214 can be implemented with technologies and techniques similar to the implementation of the control interface 210.

The memory interface unit 206 can enable external communication to and from the memory controller 104. For example, the memory interface unit 206 can permit the memory controller 104 to communicate with the memory array 106 of FIG. 1.

The memory interface unit 206 can include a memory interface 216. The memory interface 216 can be used for communication between the memory interface unit 206 and other functional units in the memory controller 104. The memory interface 216 can receive information from the other functional units or can transmit information to the other functional units.

The memory interface 216 can include different implementations depending on which functional units are being interfaced with the memory interface unit 206. The memory interface 216 can be implemented with technologies and techniques similar to the implementation of the control interface 210.

The host interface unit 208 allows the host system 108 of FIG. 1 to interface and interact with the memory controller 104. The host interface unit 208 can include a host interface 218 to provide communication mechanism between the host interface unit 208 and the host system 108.

The control unit 202 can operate the host interface unit 208 to send control or status information generated by the memory controller 104 to the host system 108. The control unit 202 can also execute the software 212 for the other functions of the memory controller 104. The control unit 202 can further execute the software 212 for interaction with the memory array 106 via the memory interface unit 206.

The functional units in the memory controller 104 can work individually and independently of the other functional units. For illustrative purposes, the memory controller 104 is described by operation of the memory controller 104 with the host system 108 and the memory array 106. It is understood that the memory controller 104, the host system 108, and the memory array 106 can operate any of the modules and functions of the memory controller 104.

Figure 3:
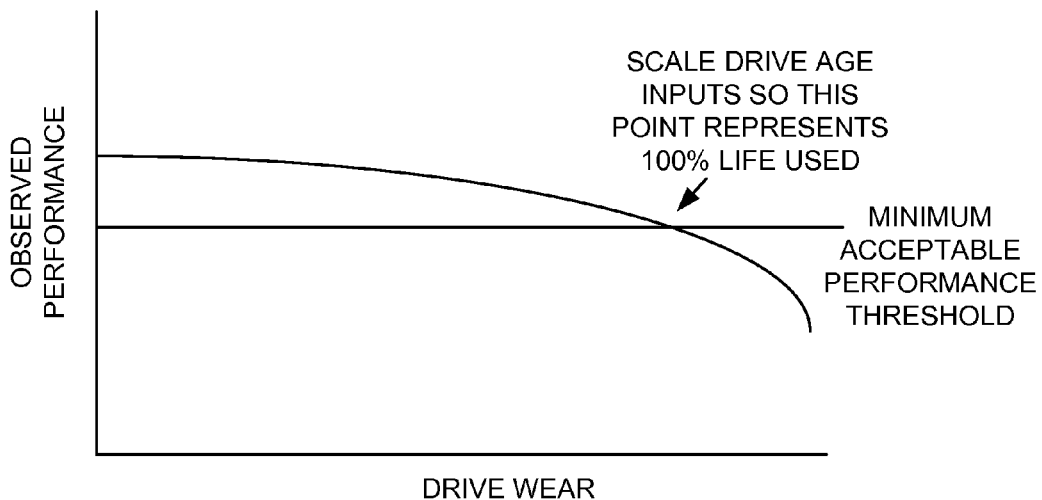
FIG. 3 is a chart indicating drive performance as a function of drive wear.

Referring now to FIG. 3, therein is shown a chart indicating drive performance as a function of drive wear. The electric system can track a drive age using a combination of multiple metrics or age criteria, including gradual wear, number of growth defects, rate of change of grown defects, and number of read retries.

The drive age is a percentage of a storage drive's expected life that has already been used. For example, the drive age can be indicated as an integer between a range of 0 to 100 inclusively. In another example, the drive age is indicated as an integer between a range of 0 to 10,000, or more generally 0 to a maximum age. The drive age indicates a "threshold" of the storage drive's life such that the percentage of the maximum age indicated by the drive age corresponds to a percentage of the storage drive's life that has been depleted.

The drive age can include the maximum estimate of several age criteria of the storage drive, such as an estimate based on the accumulated program/erase cycles. The age criterion may have a larger range such as if a program/erase scale factor is 110, that criterion will be in the range of 0 to 110 (or more generally 0 to 1.1 times the maximum age) but the drive age is restricted to 0-100 (or more generally 0 to the maximum age).

The program/erase cycle is a base level operation of how data is replaced within an erase block. Memory types, such as NAND, have a limited number of useful program/erase cycles or PE cycles.

The drive age can also include an estimate of drive life based on the age criterion of the number of grown defects in the storage drive. A grown defect is defined as an erase block that fails after fewer program/erase cycles than expected.

For example, the electric system can track a drive's expected life in terms of both the drive's ability to retain data reliably and the drive's ability to service host operations at an acceptable performance level given the required background task and retries that result from accessing worn flash.

Performance will start to drop off due to advanced error and recovery and flash configuration before the drive would be at risk of data loss. Estimating when performance is too impacted is important to ensuring the continued use and reliability of the storage drive. This storage drive performance behavior as a function of drive wear is illustrated by the chart seen in FIG. 3.

For example, the observed performance of the storage drive can decrease as the storage drive continues to wear. When the observed performance falls below the minimum acceptable performance threshold, the drive age can be at 100 percent of life used.

Based on the storage drive behavior, the method of estimating the percentage of a drive's expected life can rely on the gradual wear that occurs with each program/erase cycle and grown defects, which are defined as the occasional early failure of an erase block.

Other types of age criteria, such as related drive criteria or metrics can be used including rate of change in the number of grown defects and the number of read retries of the storage drive. The drive age can be estimated by calculating the largest of these drive criteria or metrics.

For example, it has been found that the drive age can be calculated as an estimate based on the accumulated program/erase cycles using Equation (1) herein called the gradual wear equation:

$$\text{drive age} = \text{PE scale factor} \times \frac{\text{total PE measured}}{\text{erase block lifetime PE} * \text{total erase blocks}} \quad (1)$$

The PE scale factor or program erase cycle scale factor is defined as a relative weighting given to the gradual wear drive age estimate. The total PE measured is defined as the total number of program/erase cycles that have occurred on each erase block on the entire storage drive during the time of the calculation.

The erase block lifetime PE is defined as the estimated number of program/erase cycles that an erase block can endure. The total erase blocks are defined as the total number of erase blocks in the storage drive.

Further, it has been found that the drive age can be calculated as an estimate based on the number of grown defects using Equation (2) herein called the grown defect equation:

$$\text{drive age} = \text{defect scale factor} * \frac{\text{number of grown defects}}{\text{maximum allowed number of grown defects}} \quad (2)$$

The defect scale factor is defined as the relative weight given to the grown defect estimate or grown defect age criterion. The number of grown defects is defined as the number of grown defects that have occurred on the drive at the current time of calculation.

The maximum allowed number of grown defects is the maximum number of grown defects that are allowed on the storage drive during its lifetime. The maximum allowed number of grown defects can be a predetermined value.

It has been found that drive age is jointly based upon the ways that flash memory wears out, including program/erase cycles and grown defects. In this way, each drive will have a current age based on whichever age criterion is more predominant at the time.

Figure 4:
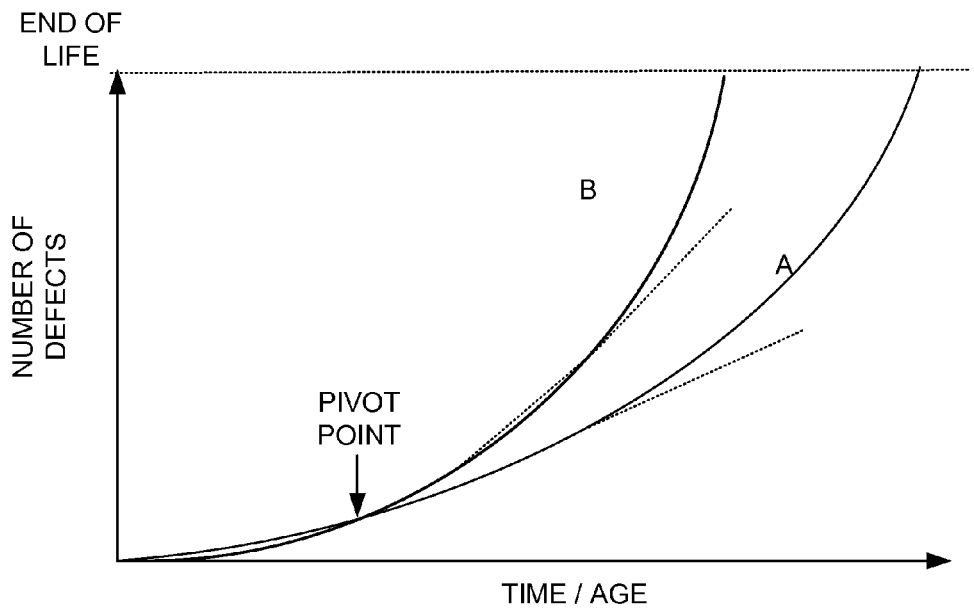
FIG. 4 is a chart indicating the number of grown defects as a function of storage drive age.

Referring now to FIG. 4, therein is shown a chart indicating the number of grown defects as a function of storage drive age. It has been found that the defect rate, which is defined as the number of new or grown defects per unit time, increases as a function of storage drive use (with the assumption of relatively constant use of the drive over time).

For example, the defect rate can be used to provide another estimate of drive age based on the defect rate at any given time. This storage drive behavior as a function of drive age is illustrated by the chart seen in FIG. 4.

In the figure, curve A illustrates a storage drive where the number of defects increases with age. More significantly, the slope of curve A, as indicated by the dotted line, indicates the defect rate. It can be seen that this is increasing with time.

Curve B is indicative of another storage drive that is aging more rapidly. At the place where the two curves diverge, which is the pivot point, the slope of curve B is steeper than curve A. This shows that the defect rate is higher for curve B than curve A. This increase in the defect rate can be used to indicate that drive B has a higher drive age than drive A.

It has been found that drive age can be used to monitor the health of a single drive as well as be used to compare the drive life of multiple drives. For example, the drive age of a storage drive and another storage drive can be determined for comparing the life span of each drive to each other. The drive age provides a uniform and consistent metric in comparing the drive life or age of multiple drives as well as indicating the current health of a single drive. The drive age provides drive swapping and drive age leveling configuration applications to preserve the drive life of storage devices.

Figure 5:
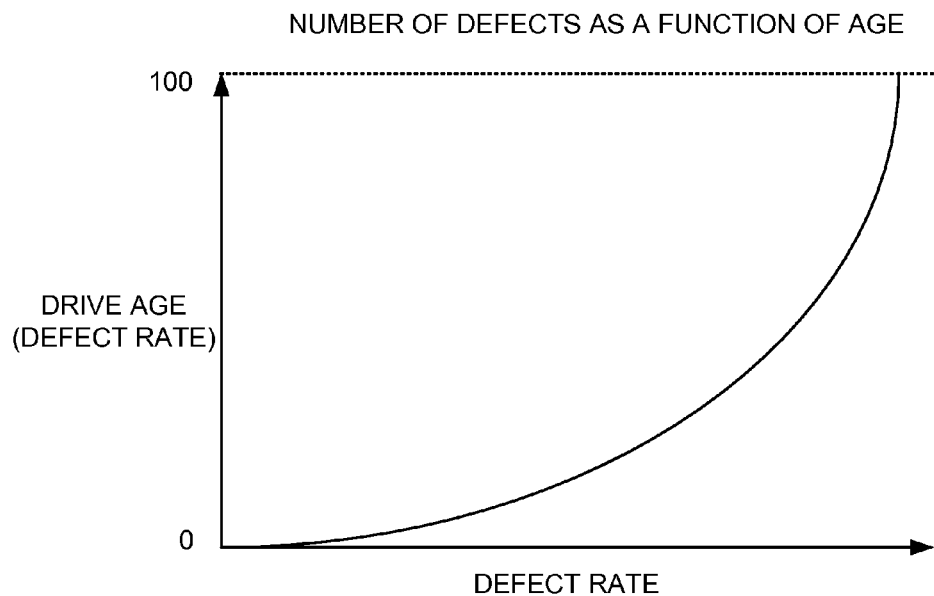
FIG. 5 is a chart indicating drive age as a function of defect rate.

Referring now to FIG. 5, therein is shown a chart indicating drive age as a function of defect rate. The chart shows that it has been found the defect rate rises over the life of the storage drive and the defect rate can be used to estimate the drive age.

For example, it has been found that drive age can be estimated using Equation (3) herein called the defect rate equation:

$$\text{drive age}_{defectrate} = \text{defect rate scale factor} * \frac{\text{Measured defect rate}}{\text{Max end of life defect rate}} \quad (3)$$

The defect rate scale factor is defined as a relative weight given to the defect rate drive age estimate or the change in defect rate age criterion. For example, the defect rate scale factor can be 100 and be scaled to a specific percentage. The defect rate scale factor, as well as the other scale factors for the other age criteria can be set to a higher or lower value to cause the scale factor to have a higher impact on the drive age or age estimate. The measured defect rate is defined as the number of new (grown) defects per unit time.

The max end of life defect rate is defined as the maximum defect rate the storage drive can reach and still meet predetermined performance requirements. For example, a drive's end-of-life performance might be specified to be one percent of the erase blocks of the storage drive per day.

Further, it has been found that the calculation of the drive age as an estimate based on the read retry rate or retry rate criterion can be determined using Equation (4) herein called the retry rate equation:

$$\text{drive age}_{RetryRate} = \text{retry rate scale factor} * \frac{\text{Measured Retry Rate}}{\text{Max end of life retry rate}} \quad (4)$$

A read retry is defined as reading data bytes again from the memory due to issues encountered when reading the data for the first time.

The measured retry rate (retries per read operations) is defined as the number of read failures due to error-correcting code (ECC) limit exceeded per read operations submitted.

The retry rate scale factor is defined as a relative weight given to the retry rate drive age estimate or the retry rate age criterion. For example, the retry rate scale factor can be 100 and be scaled to a specific higher or lower percentage to cause the retry rate to have a higher or lower impact on the drive age.

The max end of life retry rate is defined as the maximum retry rate the storage drive can reach and still meet performance requirements. For example, a storage drive's end-of-life performance might be specified to stay within five percent of the begin-of-life performance specification.

Further, it has been found that depending on the time overhead caused by retries, it is possible to calculate the maximum number of retries per read operation that the drive can operate at and stay within the pre-determined specification requirements. For example, some storage drives can tolerate at most one retry per one thousand read operations before performance is significantly impacted.

It has been found that the scale factors of the age criteria, including the PE scale factor, the defect scale factor, the defect rate scale factor, and the retry rate scale factor, can be adjusted to cause the scale factor to have a higher impact on the drive age. For example, the scale factor can be used to include a margin of error for the drive age compared to the actual failure stage of the storage drive. Further for example, the drive age can be estimated to be 100 by the use of the scale factor before the actual failure stage of the storage device. The margin of error provided by the scale factor ensures that the storage device can continue to perform reliably and predictably before the actual failure of the drive.

For example, the PE scale factor can be 100 and the defect scale factor can be 110. In this way, the drive age will reach 100 while more grown defects are still allowed. This margin is provided so that the storage drive can still be used for a short time after reaching the drive age of 100, ensuring storage drive reliability, avoiding loss of data, and providing replacement time for the drive.

Figure 6:
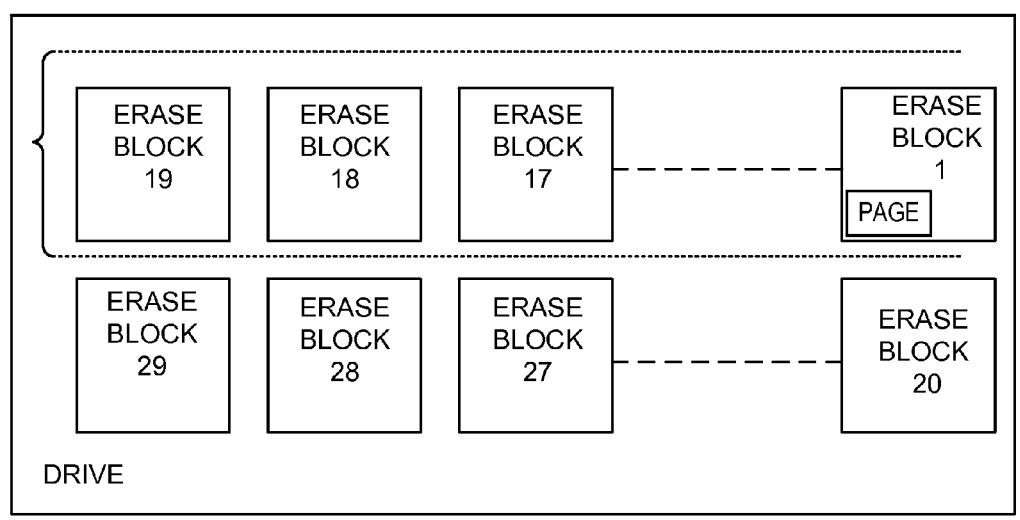
FIG. 6 is an example diagram of the storage blocks within the storage drive of the electronic system of FIG. 1.

Referring now to FIG. 6, therein is shown an example diagram of the storage blocks within the storage drive of the electronic system. The example includes pages and erase blocks in the storage drive, which can be housed in the memory array of FIG. 1.

A page is defined as the smallest group of data bytes that can be read from, or written to, in an erase block. An erase block is a group of pages, which contain the smallest number of pages that can be erased at one time.

Figure 7:
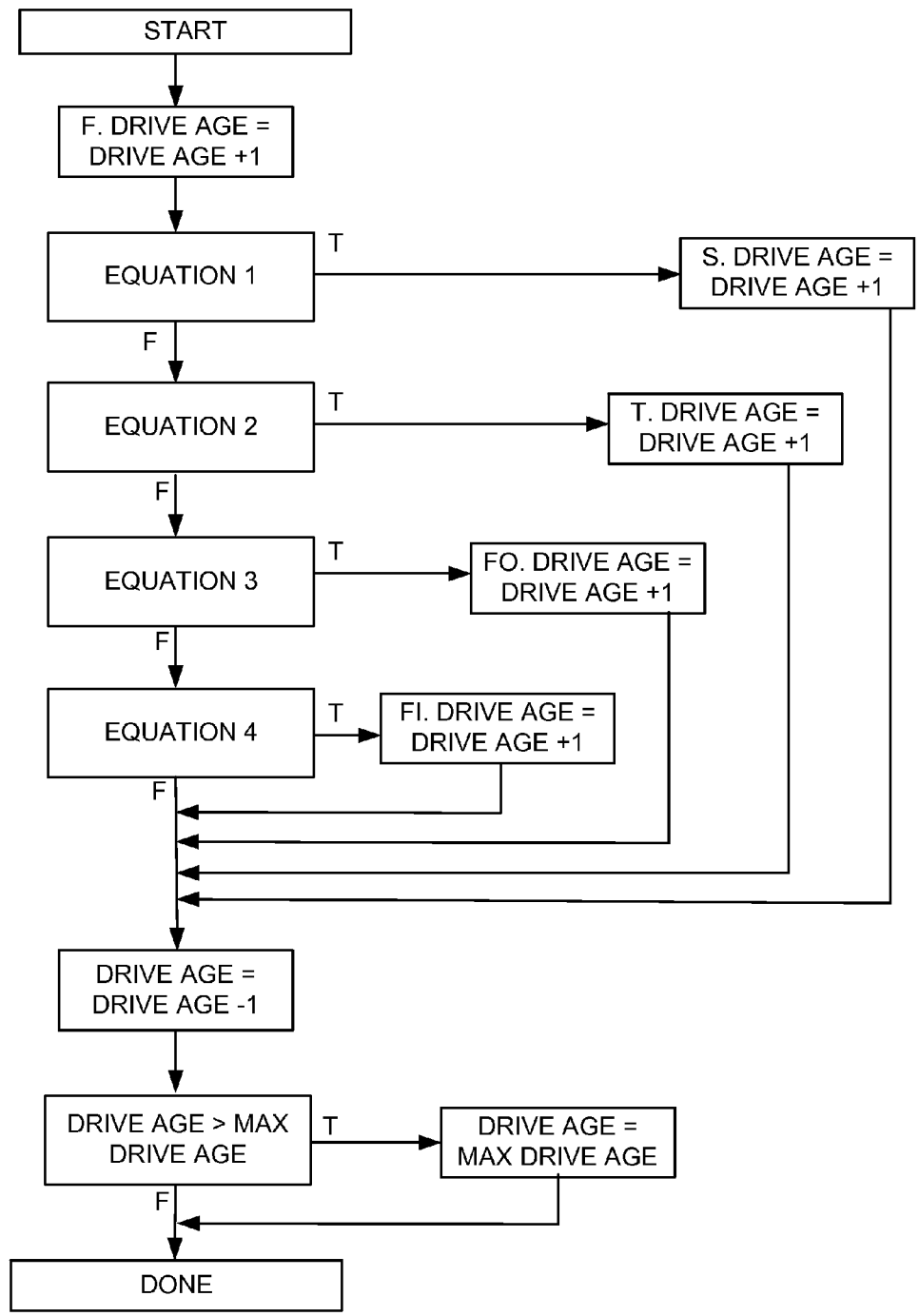
FIG. 7 is a control flow of the memory controller of FIG. 2 of the electric system.

Referring now to FIG. 7, therein is shown a control flow of the memory controller of FIG. 2 of the electric system. The memory controller can execute the control flow for calculating the drive age based on the various age criteria of the storage drive. The control flow can use pseudo-code such that expressions of "drive age=drive age+1" mean that the variable of drive age is incremented by 1.

The drive age is the maximum of the various underlying drive age criteria of the storage drive, such as the drive age based on the total PE measured, or the drive age based on the number of grown defects. Each of these age criteria has its own scale factor. The scale factor might allow that particular criterion to be outside of the range [0,100] but the final drive age is limited to [0, 100].

It has been found that the drive age can be an inherent integer, with the corresponding advantages in calculation and storage over a floating-point representation or a fixed-point representation containing a fractional part.

The control flow can begin at "start" and continue to a first drive age plus one step. The first drive age plus one step or function provides a bias at the beginning of the drive age calculations. It has been found that by providing a bias at the beginning of the calculations (where drive age is incremented by 1 before calculating the underlying age criteria), and then removing it later (where the drive age is decremented by 1 after calculating the underlying age criteria), the calculations of the underlying age criteria are simplified.

For example, it is desirable that the drive age remain at 0 until 1% of the drive's life is used, and only then increase to 1. If the drive age were not implemented as in integer calculation, it should have a floor function at the end of the calculation to cause this behavior. A way to perform that is to bias the calculations up and then remove the bias at the end of the calculations.

Further, it has been found that by biasing the drive age once at the beginning of the calculations, and removing the bias at the end of all the calculations, the step of having to perform this operation on each of the individual calculations is avoided. In addition, biasing the drive age involves simply incrementing and later decrementing by 1. However, the bias needed in the age criteria calculations would be more complicated than this base example.

The control flow can proceed to an equation one step or function. The memory controller can execute or calculate Equation (1) from FIG. 3 to determine the drive age based on gradual wear or accumulated program/erase cycles. Equation (1) can be modified to avoid division operations as follows:

$$(PE\ factor * total\ PE\ measured) \geq (drive\ age * erase\ block\ lifetime\ PE * total\ erase\ blocks) \quad (1)$$

It has been found that by rearranging the calculations of the age criterion to those currently shown in the modified Equation (1) provide the benefit of no division operations being required. Division operations, which would be used in the most obvious implementations, are slow and cumbersome on most hardware. Equation (2), Equation (3), and Equation (4) can be rearranged in the same way to remove division operations, which increases the processing speed of the calculations by the memory controller.

If Equation (1) is found to be true, the control flow can proceed to a second age plus one step. After the drive age has been incremented by one by the second age plus one step, the control flow can proceed to a drive age minus one step. If Equation (1) is found to be false, the control flow can proceed to Equation (2).

The memory controller can execute or calculate Equation (2) to determine the drive age based on the number of grown defects. Equation (2) can be modified to avoid division operations as follows:

$$(defect\ scale\ factor * number\ of\ grown\ defects) \geq (drive\ age * maximum\ allowed\ number\ of\ grown\ defects) \quad (2)$$

If Equation (2) is found to be true, the control flow can proceed to a third drive age plus one step. After the drive age has been incremented by one, the control flow can proceed to a drive age minus one step. If Equation (2) is found to be false, the control flow can proceed to Equation (3).

The memory controller can execute or calculate Equation (3) to determine the drive age based on the change in defect rate. Equation (3) can be modified to avoid division operations as follows:

$$(defect\ rate\ scale\ factor * Measured\ defect\ rate) \geq (drive\ age * max\ end\ of\ life\ defect\ rate) \quad (3)$$

If Equation (3) is found to be true, the control flow can proceed to a fourth drive age plus one step. After the drive age has been incremented by one, the control flow can proceed to a drive age minus one step. If Equation (3) is found to be false, the control flow can proceed to Equation (4).

The memory controller can execute or calculate Equation (4) to determine the drive age based on the retry rate. Equation (4) can be modified to avoid division operations as follows:

$$(retry\ rate\ scale\ factor * Measured\ Retry\ Rate) \geq drive\ age * Max\ end\ of\ life\ retry\ rate) \quad (4)$$

If Equation (4) is found to be true, the control flow can proceed to a fifth drive age plus one step. After the drive age has been incremented by one, the control flow can proceed to a drive age minus one step. If Equation (4) is found to be false, the control flow can proceed to the drive age minus one step.

The control flow can proceed to the drive age minus one step from Equation (4), from the second drive age plus one step, the third drive age plus one step, the fourth drive age plus one step, or the fifth drive age plus one step. The bias of plus one that was included at the beginning of the control flow is removed during the drive age minus one step.

The control flow can proceed to a max drive age step after the drive age minus one step. The memory controller compares the drive age to the maximum drive age. The maximum drive age can be a predetermined value. For example, the maximum drive age can equal 100 or 99.

If the drive age is greater than the maximum drive age, then the storage drive has reached the maximum drive age. In this situation, the drive age is set to equal the maximum drive age. Based on this situation, a notification or warning to the user can be generated of the imminent failure of the storage drive and the control flow can conclude at "done". If the drive age is less than the maximum drive age, the control flow can conclude at "done".

It has been found that by calculating the age criteria sequentially, and skipping over the remaining age criteria if the drive age is incremented, calculations can be saved, and the storage drive age will not have any "missing codes" (the drive age will take on every value in [0, 100].

For example, Equation (1) to Equation (4) is sequentially calculated if the previous equation is found to be false. Subsequent equations are skipped if the current equation is found to be true. It has been discovered that the sequential calculation of the equations will also automatically select, over time, the maximum of all of the criteria, which will be reported as the drive age. The relative scale factors used in each criterion allows some criteria to have greater significance in the result.

It has been also found that calculating the drive age as an integer percentage provides the drive age as a monotonically non-decreasing value; this is a desirable property for the drive age for life of a single drive, and for comparing multiple storage drives to each other. Drive age results as integer percentages are consistent and predictable, which increases the reliability and predictability of the drive life of the storage drive.

It has also been found that by iteratively updating the drive age instead of calculating it directly on each update, the electronic system saves computational operations and yields the drive age guaranteed to be monotonically non-decreasing because of the single integer unit increments.

Figure 8:
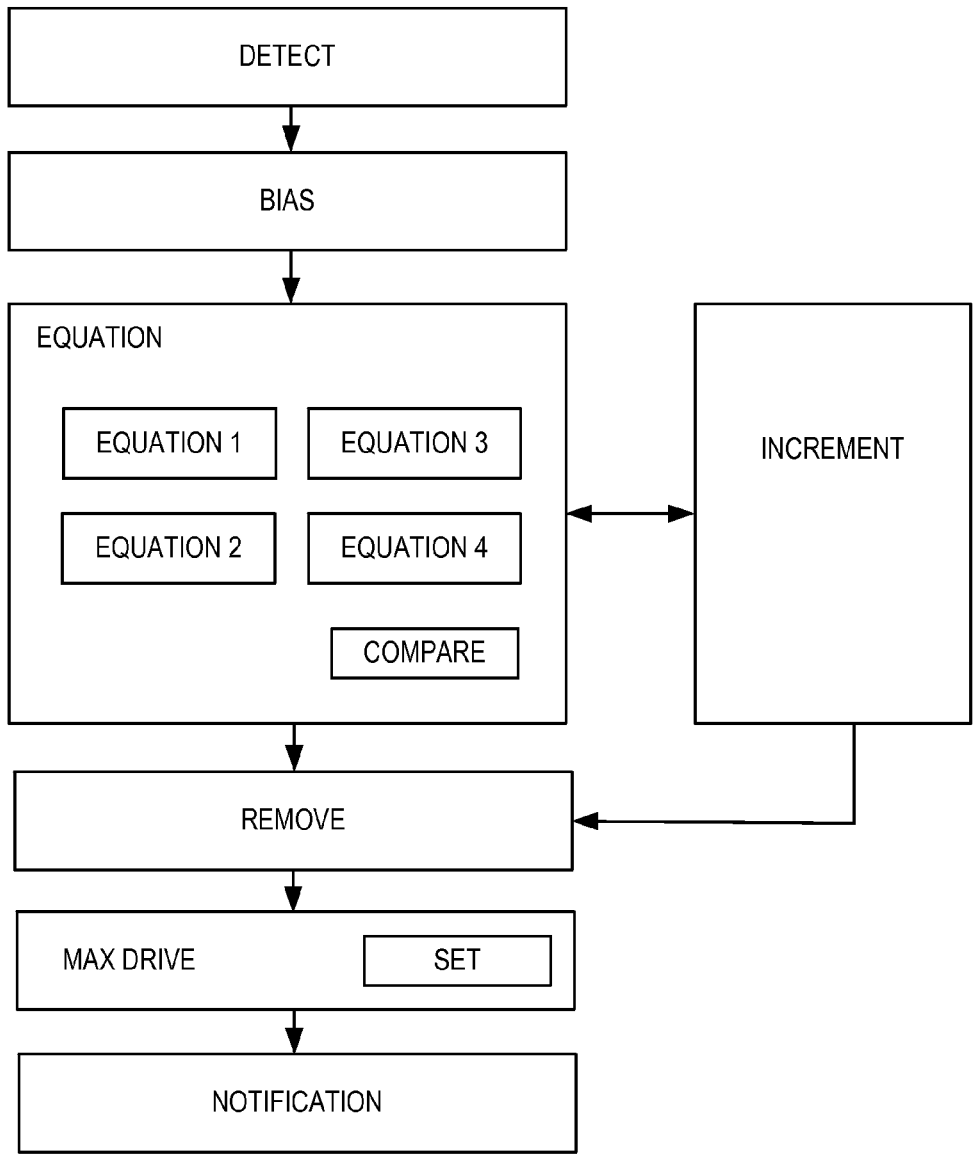
FIG. 8 is a second example of the control flow of the memory controller of FIG. 2 of the electric system.

Referring now to FIG. 8, therein is shown a second example of the control flow of the memory controller of FIG. 2 of the electric system. The memory controller can execute the second control flow for determining the drive age. The control flow can include a detect module, a bias module, an equation module, an increment module, a remove module, a max drive module, and a notification module. The second example control flow is similar to the control flow of FIG. 7 except that the steps and functions have been partitioned into modules.

In the control flow, as an example, each module is indicated by an order and successively higher modules follow one another. Control flow can pass from one module to the next sequential module unless explicitly otherwise indicated. The memory controller of FIG. 2 can execute the detect module, the bias module, the equation module, the increment module, the remove module, the max drive module, and the notification module.

The detect module can recall or access the current drive age at the time of the calculation for the estimate. The bias module increases the drive age by one to assign a bias.

The equation module can execute Equation (1), Equation (2), Equation (3), and Equation (4) to determine the drive age. The equations can be modified to remove division operations. It has been found that by rearranging the calculations of the underlying age criteria to those listed under the section for FIG. 7, no division operations are required, speeding up processing time.

For example, division operations, which would be used in the most obvious implementations, are slow and cumbersome on most hardware. Equation (1), Equation (2), Equation (3), and Equation (4) can be rearranged in the same way to remove division operations, which increases the processing speed of the calculations.

The equation module can include sub modules for executing the calculations for each of the equations based on age criteria. For example, an "equation one" sub-module can execute the calculations for Equation (1) and the electric system can include other sub-modules for Equation (2), Equation (3), and Equation (4).

The compare module can compare the metrics produced by each equation to determine the largest of the drive age estimates. The largest of the estimates from Equation (1), Equation (2), Equation (3), and Equation (4) will be used as the drive age.

The increment module can increase the drive age by one if any of the equations from the equation module are found to be true. The increment module can be coupled to the equation module and the remove module.

The remove module removes the bias that was added to the drive age by the bias module. The remove module can perform the drive age minus one step of FIG. 7. The remove module can be coupled to the equation module, the increment module, and the max drive module.

The max drive module determines if the drive age is greater or equal to the max drive age or maximum drive age. The max drive module can detect if the drive age has reached the max drive age. The max drive age can be a pre-determined percentage such as 100 or 99 percent. The max drive module can include a set module for setting the drive age to equal the max drive age.

The notification module can generate a notification or warning that the drive age of the storage drive has reached the max drive age. This allows users warning to back up information and timely replace the storage drive.

The control flow of the memory controller describes the module functions or order as an example. The modules can be partitioned differently. For example, the modules described in FIG. 8 can be implemented as one module or with a lesser number of modules. Each of the modules can operate individually and independently of the other modules.

The modules of FIG. 8 can be hardware implementations in the memory controller or can be implemented as hardware within the electronic system but outside the memory controller. The modules of the memory controller can be hardware, software running on or coupled to hardware, or a combination thereof.

Figure 9:
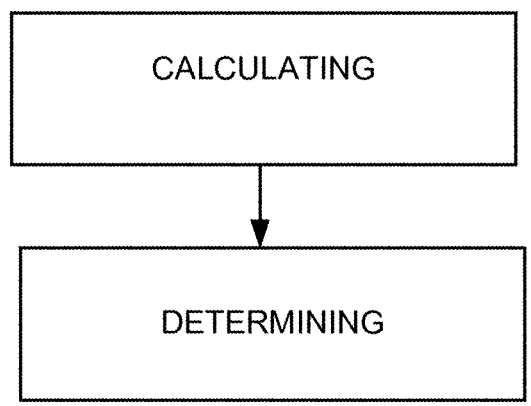
FIG. 9 is a flow chart of a method of operation of the electronic system of FIG. 1 in a further embodiment of the present invention.

Referring now to FIG. 9, therein is shown a flow chart of a method of operation of the electronic system of FIG. 1 in a further embodiment of the present invention. The method includes: calculating an age criterion in a block; and determining the drive age based on the age criterion in another block.

Thus, it has been discovered that the electronic system of the present invention furnishes important and heretofore unknown and unavailable solutions, capabilities, and functional aspects for an electronic system with read disturb management mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance. These and other valuable aspects of the present invention consequently further the state of the technology to at least the next level.

It will be understood that, although the terms "first," "second," etc. may be used herein to describe various elements, these elements should not be limited by these terms. These terms are only used to distinguish one element from another. For example, a first age criterion could be termed a second age criterion, and, similarly, a second age criterion could be termed a first age criterion, without changing the meaning of the description, so long as all occurrences of the "first age criterion" are renamed consistently and all occurrences of the "second age criterion" are renamed consistently. The first age criterion and the second age criterion are both age criteria, but they are not the same age criterion.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of operation of an electronic system comprising:
   determining two or more age criteria of a storage drive;
   determining a drive age of the storage drive in accordance with the two or more age criteria of the storage drive by:
      determining a first scaled age criterion by multiplying a first configurable factor by a first age criterion of the two or more age criteria;
      determining a first drive age indicator by multiplying the drive age by a first maximum age criterion for the storage drive, wherein the first maximum age criterion is a maximum value of the first age criterion; and
      in accordance with a determination that the first scaled age criterion is greater than or equal to the first drive age indicator, incrementing the drive age; and
   after determining the drive age and in accordance with a determination that the incremented drive age is greater than or equal to the first maximum drive age criterion associated with the first age criterion, generating a notification that the drive age of the storage drive has reached the first maximum drive age criterion or a notification of imminent failure of the storage drive.

2. The method of claim 1, wherein the two or more age criteria include a retry rate.

3. The method of claim 1, wherein the two or more age criteria are scaled by respective configurable factors to adjust relative importance of each respective age criterion of the storage drive.

4. The method of claim 1, further comprising:
   in accordance with a determination that the first scaled age criterion is not greater than or equal to the first drive age indicator, performing one or more operations including:
      determining a second scaled age criterion by multiplying a second configurable factor by a second age criterion of the two or more age criteria;
      determining a second drive age indicator by multiplying the drive age by a second maximum age criterion for the storage drive, wherein the second maximum age criterion is a maximum value of the second age criterion;
      and
      in accordance with a determination that the second scaled age criterion is greater than or equal to the second drive age indicator, incrementing the drive age.

5. The method of claim 1, wherein the drive age is monotonically non-decreasing.

6. The method of claim 1, wherein the two or more age criteria include a defect rate.

7. The method of claim 1, wherein the storage drive comprises one or more flash memory devices.

8. An electronic system comprising:
   one or more processors; and
   memory storing one or more programs to be executed by the one or more processors, the one or more programs comprising instructions for:
      determining two or more age criteria of a storage drive;
      determining a drive age of the storage drive in accordance with the two or more age criteria of the storage drive by:
         determining a first scaled age criterion by multiplying a first configurable factor by a first age criterion of the two or more age criteria;
         determining a first drive age indicator by multiplying the drive age by a first maximum age criterion for the storage drive, wherein the first maximum age criterion is a maximum value of the first age criterion; and
         in accordance with a determination that the first scaled age criterion is greater than or equal to the first drive age indicator, incrementing the drive age; and
      after determining the drive age and in accordance with a determination that the incremented drive age is greater than or equal to the first maximum drive age criterion associated with the first age criterion, generating a notification that the drive age of the storage drive has reached the first maximum drive age criterion or a notification of imminent failure of the storage drive.

9. The electronic system of claim 8, wherein the two or more age criteria include a retry rate.

10. The electronic system of claim 8, wherein the two or more age criteria are scaled by respective configurable factors to adjust relative importance of each respective age criterion of the storage drive.

11. The electronic system of claim 8, wherein the one or more programs further comprise instructions for:
in accordance with a determination that the first scaled age criterion is not greater than or equal to the first drive age indicator, performing one or more operations including:
determining a second scaled age criterion by multiplying a second configurable factor by a second age criterion of the two or more age criteria;
determining a second drive age indicator by multiplying the drive age by a second maximum age criterion for the storage drive, wherein the second maximum age criterion is a maximum value of the second age criterion;
and
in accordance with a determination that the second scaled age criterion is greater than or equal to the second drive age indicator, incrementing the drive age.

12. The electronic system of claim 8, wherein the drive age is monotonically non-decreasing.

13. The electronic system of claim 8, wherein the two or more age criteria include a defect rate.

14. The electronic system of claim 8, wherein the storage drive comprises one or more flash memory devices.

15. A non-transitory computer readable storage medium, storing one or more programs configured for execution by one or more processors of an electronic system, the one or more programs including instructions for:
determining two or more age criteria of a storage drive;
determining a drive age of the storage drive in accordance with the two or more age criteria of the storage drive by:
determining a first scaled age criterion by multiplying a first configurable factor by a first age criterion of the two or more age criteria;
determining a first drive age indicator by multiplying the drive age by a first maximum age criterion for the storage drive, wherein the first maximum age criterion is a maximum value of the first age criterion; and
in accordance with a determination that the first scaled age criterion is greater than or equal to the first drive age indicator, incrementing the drive age; and
after determining the drive age and in accordance with a determination that the incremented drive age is greater than or equal to the first maximum drive age criterion associated with the first age criterion, generating a notification that the drive age of the storage drive has reached the first maximum drive age criterion or a notification of imminent failure of the storage drive.

16. The non-transitory computer readable storage medium of claim 15, wherein the two or more age criteria include a retry rate.

17. The non-transitory computer readable storage medium of claim 15, wherein the two or more age criteria are scaled by respective configurable factors to adjust relative importance of each respective age criterion of the storage drive.

18. The non-transitory computer readable storage medium of claim 15, wherein the one or more programs further comprise instructions for:
in accordance with a determination that the first scaled age criterion is not greater than or equal to the first drive age indicator, performing one or more operations including:
determining a second scaled age criterion by multiplying a second configurable factor by a second age criterion of the two or more age criteria;
determining a second drive age indicator by multiplying the drive age by a second maximum age criterion for the storage drive, wherein the second maximum age criterion is a maximum value of the second age criterion;
and
in accordance with a determination that the second scaled age criterion is greater than or equal to the second drive age indicator, incrementing the drive age.

19. The non-transitory computer readable storage medium of claim 15, wherein the drive age is monotonically non-decreasing.

20. The non-transitory computer readable storage medium of claim 15, wherein the two or more age criteria include a defect rate.

* * * * *